US010699589B2

(12) United States Patent
Beigman Klebanov et al.

(10) Patent No.: US 10,699,589 B2
(45) Date of Patent: Jun. 30, 2020

(54) SYSTEMS AND METHODS FOR DETERMINING THE VALIDITY OF AN ESSAY EXAMINATION PROMPT

(71) Applicant: Educational Testing Service, Princeton, NJ (US)

(72) Inventors: Beata Beigman Klebanov, Hopewell, NJ (US); David Kaufer, Pittsburgh, PA (US); Paul L. Yeoh, Omaha, NE (US)

(73) Assignee: Educational Testing Service, Princeton, NJ (US)

( * ) Notice: Subject to any disclaimer, the term of this patent is extended or adjusted under 35 U.S.C. 154(b) by 233 days.

(21) Appl. No.: 14/715,697

(22) Filed: May 19, 2015

(65) Prior Publication Data

US 2015/0332599 A1    Nov. 19, 2015

Related U.S. Application Data

(60) Provisional application No. 62/000,023, filed on May 19, 2014.

(51) Int. Cl.
 *G09B 7/02* (2006.01)
(52) U.S. Cl.
 CPC ..................... *G09B 7/02* (2013.01)
(58) Field of Classification Search
 CPC ....................................................... G09B 7/02
 USPC ......................................................... 434/350
 See application file for complete search history.

(56) References Cited

U.S. PATENT DOCUMENTS

| 6,000,945 | A  | * | 12/1999 | Sanchez-Lazer | ........ | G09B 7/02 |
|           |    |   |         |               |          | 434/118   |
| 6,259,890 | B1 | * | 7/2001  | Driscoll      | ........ | G09B 7/02 |
|           |    |   |         |               |          | 434/118   |
| 7,711,312 | B2 | * | 5/2010  | Higgins       | ........ | G09B 7/02 |
|           |    |   |         |               |          | 434/353   |
| 8,655,794 | B1 | * | 2/2014  | Cobb          | ........ | G09B 7/02 |
|           |    |   |         |               |          | 705/1.1   |
| 8,996,993 | B2 | * | 3/2015  | Turner        | ........ | 715/256   |

(Continued)

OTHER PUBLICATIONS

Types of Essays: End the Confusion; Sep. 15, 2010; Time4Writing; https://web.archive.org/web/20100915172805/https://www.time4writing.com/writing-resources/types-of-essays/; (Year: 2010).*

(Continued)

*Primary Examiner* — Thomas J Hong
(74) *Attorney, Agent, or Firm* — Jones Day

(57) ABSTRACT

Systems and methods are provided for determining whether an examination prompt elicits responses of a type for which the examination prompt is designed. Word types for each of a plurality of words in a plurality of responses to the examination prompt are identified. An evaluation distribution of the identified word types is determined. Predetermined distributions stored on a computer-readable medium associated with a plurality of different response types are accessed, and the evaluation distribution is compared to each of the predetermined distributions to determine which predetermined distribution the evaluation distribution is most similar. A determination is made as to whether the most similar distribution is associated with a same response type as the type for which the examination prompt is designed. An indication is made as to whether the examination prompt is deemed to elicit responses of the type for which the examination prompt is designed.

14 Claims, 9 Drawing Sheets

(56) References Cited

U.S. PATENT DOCUMENTS

| | | | | |
|---|---|---|---|---|
| 2002/0156632 | A1* | 10/2002 | Haynes | G09B 7/04 704/270 |
| 2002/0182579 | A1* | 12/2002 | Driscoll | G09B 7/02 434/350 |
| 2004/0175687 | A1* | 9/2004 | Burstein | G06F 17/27 434/353 |
| 2005/0142529 | A1* | 6/2005 | Andreyev | G09B 7/00 434/362 |
| 2005/0143971 | A1* | 6/2005 | Burstein | G06F 17/274 704/4 |
| 2005/0153269 | A1* | 7/2005 | Driscoll | G09B 7/02 434/350 |
| 2005/0175974 | A1* | 8/2005 | Hansen | G09B 7/00 434/322 |
| 2006/0003306 | A1* | 1/2006 | McGinley | G09B 3/00 434/350 |
| 2006/0172276 | A1* | 8/2006 | Higgins | G09B 7/00 434/362 |
| 2006/0240390 | A1* | 10/2006 | Attali | G09B 7/02 434/156 |
| 2007/0218450 | A1* | 9/2007 | MacClay | G09B 5/00 434/353 |
| 2009/0176198 | A1* | 7/2009 | Fife | G09B 7/02 434/353 |
| 2011/0125734 | A1* | 5/2011 | Duboue | G09B 7/00 707/723 |
| 2012/0237907 | A1* | 9/2012 | Ling | G09B 19/00 434/236 |
| 2013/0302775 | A1* | 11/2013 | King | G09B 7/00 434/362 |
| 2014/0317032 | A1* | 10/2014 | Haberman | G06N 5/022 706/12 |
| 2014/0335498 | A1* | 11/2014 | Muthukumarasamy | G09B 7/00 434/350 |
| 2014/0370485 | A1* | 12/2014 | Deane | G09B 7/02 434/353 |
| 2015/0199913 | A1* | 7/2015 | Mayfield | G09B 7/02 434/353 |

OTHER PUBLICATIONS

Atkinson, Nathan, Kaufer, David, Ishizaki, Suguru; Presence and Global Presence in Genres of Self-Presentation: A Framework for Comparative Analysis; Rhetoric Society Quarterly, 38(3); pp. 1-27; Jul. 2008.

Beigman Klebanov, Beata, Burstein, Jill, Madnani, Nitin, Faulkner, Adam, Tetreault, Joel; Building Subjectivity Lexicons From Scratch for Essay Data; Proceedings of the 13th International Conference on Intelligent Text Processing and Computational Linguistics; New Delhi, India; pp. 591-602; 2012.

Bradley, Margaret, Lang, Peter; Affective Norms for English Words (ANEW): Instruction Manual and Affective Ratings; Technical Report C-1, Center for Research in Psychophysiology; University of Florida; 1999.

Hart, Roderick; Campaign Talk: Why Elections Are Good for Us; Princeton University Press: Princeton, NJ; 2002.

Hart, Roderick; Diction: The Text Analysis Program; www.dictionsoftware.com; 2011.

Hope, Jonathan, Witmore, Michael; The Hundredth Psalm to the Tune of "Green Sleeves": Digital Approaches to Shakespeare's Language Genre; Shakespeare Quarterly, 61(3); pp. 357-390; 2010.

Kaufer, David, Hariman, Robert; Discriminating Political Styles as Genres: A Corpus Study Exploring Hariman's Theory of Political Style; Text and Talk, 28(4); pp. 475-500; 2008.

Kaufer, David, Ishizaki, Suguru; A Corpus Study of Canned Letters: Mining the Latent Rhetorical Proficiencies Marketed to Writers-in-a-Hurry and Non-Writers; IEEE Transactions of Professional Communication, 49(3); pp. 254-266; Sep. 2006.

Kaufer, David, Ishizaki, Suguru; Butler, Brian, Collins, Jeff; The Power of Words: Unveiling the Speaker and Writer's Hidden Craft; Lawrence Erlbaum Associates: Mahwah, NJ; 2004.

Kaufer, David, Ishizaki, Suguru, Collins, Jeff, Vlachos, Pantelis; Teaching Language Awareness in Rhetorical Choice: Using IText and Visualization in Classroom Genre Assignments; Journal of Business and Technical Communication, 18(3); pp. 361-402; Jul. 2004.

Knott, Alistair; A Data-Driven Methodology for Motivating a Set of Coherence Relations; PhD. Thesis, University of Edinburgh, UK; 1996.

Knott, Alistair, Dale, Robert; Using Linguistic Phenomena to Motivate a Set of Coherence Relations; Discourse Processes, 18(1); pp. 35-62; 1994.

Marcu, Daniel; The Rhetorical Parsing of Unrestricted Texts: A Surface-Based Approach; Computational Linguistics, 26 (3); pp. 395-448; 2000.

Marcu, Daniel; The Rhetorical Parsing, Summarization, and Generation of Natural Language Texts; Ph.D. Thesis, University of Toronto; 1997.

Pang, Bo, Lee, Lillian; Opinion Mining and Sentiment Analysis; Foundations and Trends in Information Retrieval, 2 (1-2); pp. 1-135; 2008.

Pennebaker, James, Booth, Roger, Francis, Martha; Linguistic Inquiry and Word Count: LIWC2007; Lawrence Erlbaum Associates: Mahwah, NJ; 2001.

Wilson, Theresa, Wiebe, Janyce, Hoffmann, Paul; Recognizing Contextual Polarity: An Exploration of Features for Phrase-Level Sentiment Analysis; Association for Computational Linguistics, 35(3); pp. 399-433; 2008.

Altenberg, B.; Speech as Linear Composition; Proceedings from the 4th Nordic Conference for English Studies; pp. 133-143; 1990.

Bainton, George; The Art of Authorship: Literary Reminiscences, Methods of Work, and Advice to Young Beginners, Personally Contributed by Leading Authors of the Day; J. Clarke & Company; 1890.

Bazerman, Charles; Systems of Genres and the Enactment of Social Intentions; Ch. 5 in Genre and the New Rhetoric, A. Fredman & P. Medway (Eds.); Taylor & Francis: London, UK; pp. 70-101; 1994.

Bell, Madison Smartt; Narrative Design: A Writers Guide to Structure; Norton & Co.: New York, NY; 1997.

Berkenkotter, Carol, Huckin, Thomas; Genre Knowledge in Disciplinary Communication: Cognition/Culture/Power; Lawrence Erlbaum: Hillsdale, NJ; 1995.

Biber, Douglas, Conrad, Susan, Cortes, Viviana; If You Look At . . . : Lexical Bundles in University Teaching and Textbooks; Applied Linguistics, 25(3); pp. 371-405; 2004.

Biber, Douglas; Variation Across Speech and Writing; Cambridge University Press: Cambridge, UK; 1988.

Biber, Douglas, Conrad, Susan, Reppen, Randi; Corpus Linguistics: Investigating Language Structure and Use; Cambridge University Press: Cambridge, UK; 1998.

Burke, Kenneth; Rhetoric of Motives; University of California Press: Berkeley, CA; 1969.

Chafe, Wallace; Discourse, Consciousness, and Time: The Flow and Displacement of Conscious Experience in Speaking and Writing; University of Chicago Press: Chicago, IL; 1994.

Channell, Joanna; Corpus-Based Analysis of Evaluative Lexis; Ch. 3 in Evaluation in Text: Authorial Stance and the Construction of Discourse, Hunston & Thompson (Eds.); Oxford University Press: Oxford, UK; pp. 38-55; 2000.

Clark, Herbert; Using Language; Cambridge University Press: Cambridge, UK; 1996.

Collins, Jeff, Kaufer, David, Vlachos, Pantelis, Buter, Brian, Ishizaki, Suguru; Detecting Collaborations in Text: Comparing the Authors' Rhetorical Language Choices in the Federalist Papers; Computers and the Humanities, 38; pp. 15-36; 2004.

Coulson, Seana, Oakley, Todd; Blending Basics; Cognitive Linguistics, 11; pp. 175-196; 2000.

Crismore, Avon; Talking with Readers: Metadiscourse as Rhetorical Act; Peter Lang Publishing: New York, NY; 1989.

(56) References Cited

OTHER PUBLICATIONS

Ellis, Nick, Simpson-Vlach, Rita; Formulaic Language in Native Speakers: Triangulating Psycholinguistics, Corpus Linguistics, and Education; Corpus Linguistics and Linguistic Theory, 5; pp. 61-78; 2009.
Ellis, Nick, Frey, Eric; The Psycholinguistic Reality of Collocation and Semantic Prosody (2): Affective Priming; in Formulaic Language: vol. 2, Acquisition, Loss, Psychological Reality, and Functional Explanations, R. Corrigan, et al. (Eds.); pp. 473-497; 2009.
Ellis, Nick; Implicit and Explicit Knowledge About Language; In Encyclopedia of Language and Education, 2d Edition, vol. 6: Knowledge About Language, J. Cenoz & H. Homberger (Eds.); pp. 119-132; Springer; 2007.
Ellis, Nick; Phraseology: The Periphery and the Heart of Language; In Phraseology in Language Learning and Teaching, F. Meunier & S. Granger (Eds.); pp. 1-13; John Benjamins: Amsterdam; 2008.
Ellis, Nick; Construction Learning as Category Learning; Ch. 2 in Inside the Learner's Mind: Cognitive Processing and Second Language Acquisition, M. Putz & L. Sicola (Eds.); John Benjamins: Amsterdam; pp. 27-48 (date unknown).
Ellis, Nick, Frey, Eric, Jalkanen, Isaac; The Psycholinguistic Reality of Collocation and Semantic Prosody: Lexical Access; in Exploring the Lexis-Grammar Interface, U. Romer & R. Schulze (Eds.); John Benjamins: Amsterdam; pp. 89-114; 2009.
Fairclough, Norman; Language and Power; Longman: London, UK; 1989.
Fauconnier, Gilles, Turner, Mark; Conceptual Integration Networks; Cognitive Science, 22(2); pp. 133-187; 1998.
Fauconnier, Gilles; Mental Spaces: Aspects of Meaning Construction in Natural Language; Cambridge University Press: New York, NY; 1994.
Fauconnier, Gilles; Mappings in Thought and Language; Cambridge University Press: New York, NY; 1997.
Freedman, Aviva, Medway, Peter; Locating Genre Studies: Antecedents and Prospects; Ch. 1 in Genre and the New Rhetoric, A. Freedman & P. Medway (Eds.); Taylor & Francis: London, UK; pp. 1-22; 1994.
Halliday, Michael, Matthiessen, Christian; An Introduction to Functional Grammar, 3d Edition; Arnold: London; 2004.
Halliday, Michael, Hasan, Ruqaiya; Cohesion in English; Longman: London, UK; 1976.
Halliday, M.A.K., Matthieson, Christian; Construing Experience Through Meaning; Cassell: New York, NY; 1999.
Hopper, Paul, Thompson, Sandra; Transitivity in Grammar and Discourse; Language, 56(2); pp. 251-299; Jun. 1980.
Hopper, Paul, Traugott, Elizabeth; Grammaticalization; Cambridge University Press: Cambridge, UK; 1993.
Hunston, Susan, Thompson, Geoff; Evaluation in Text: Authorial Stance and the Construction of Discourse; Oxford University Press: New York, NY; 2000.
Hyland, Ken; Disciplinary Discourses: Social Interactions in Academic Writing; Longman: New York, NY; 2000.
Hyland, Ken; Bringing in the Reader: Addressee Features in Academic Articles; Written Communication, 18(4); pp. 549-574; Oct. 2001.
Jackendoff, Ray; The Representational Structures of the Language Faculty and Their Interactions; Ch. 3 in The Neurocognition of Language, C. Brown & P. Hagoort (Eds.); Oxford University Press: Oxford, UK; pp. 37-71; 1999.
Johnstone, Barbara; Discourse Analysis; Blackwell: London, UK; 2002.
Kucera, Henry, Francis, W. Nelson; Computational Analysis of Present-Day American English; Brown University Press: Providence, RI; 1967.
Langacker, Ronald; Foundations of Cognitive Grammar, vol. 1: Theoretical Prerequisites; Stanford University Press: Stanford, CA; 1987.
Manning, Christopher, Schutze, Hinrich; Foundations of Statistical Natural Language Processing; MIT Press: Cambridge, MA; 2001.
Olson, David; The World on Paper; Cambridge University Press: New York, NY; 1994.
Parsons, Terence; Events in the Semantics of English: A Study in Subatomic Semantics; MIT Press: Cambridge, MA; 1990.
Roberts, Carl; A Theoretical Map for Selecting Among Text Analysis Methods; Ch. 16 in Text Analysis for the Social Sciences, C. Roberts (Ed.); Lawrence Erlbaum Associates: Mahwah, NJ; pp. 275-283; 1997.
Scott, Mike; WordSmith Tools, version 3.0; Oxford University Press: Oxford, UK; 1998.
Sinclair, John; Corpus, Concordance, Collocation; Oxford University Press: New York, NY; 1991.
Sinclair, J.; Collins COBUILD English Dictionary; HarperCollins: London, UK; 1995.
Swales, John; Genre Analysis: English in Academic and Research Settings; Cambridge University Press: Cambridge, UK; 1990.
Akers, Aletha, Kaufer, David, Ishizaki, Suguru, Seltman, Howard, Greenhouse, Joel; A Novel Computer-Based Approach for Analyzing Focus Groups Data; Technical Report, University of Pittsburgh Medical School; 2009.
Al-Malki, Amal, Kaufer, David, Ishizaki, Suguru, Dreher, Kira; Arab Women in Arab News: Old Stereotypes and New Media; Bloomsbury Academic; 2012.
Anthony, Laurence, Lashkia, George, Mover: A Machine Learning Tool to Assist in the Reading and Writing of Technical Papers; IEEE Transactions on Professional Communications, 46(3); pp. 185-193; Sep. 2003.
Argamon, Shlomo, Whitelaw, Casey, Chase, Paul, Dhawle, Sushant, Hota, Sobhan, Garg, Navendu, Levitan, Shlomo; Stylistic Text Classification Using Functional Lexical Features; Journal of the American Society for Information Science and Technlogy, 58(6); 2007.
Atlas.Ti; Computer Program; 2007.
Burstein, Jill, Marcu, Daniel, Knight, Kevin; Finding the WRITE Stuff: Automatic Identification of Discourse Structure in Student Essays; IEEE Intelligent Systems: Special Issue on Advances in Natural Language Processing, 18(1); pp. 32-39; 2003.
Collins, Jeff; Variations in Written English: Characterizing Authors' Rhetorical Language Choices Across corpora of Published Texts; Ph.D. Thesis, Carnegie Mellon University; 2003.
Ellis, Nick, Ferreira-Junior, Fernando; Construction Learning as a Function of Frequency, Frequency Distribution, and Function; Modern Language Journal, 93; pp. 370-385; 2009.
Geisler, Cheryl; Analyzing Streams of Language: Twelve Steps to the Systematic Coding of Text, Talk, and Other Verbal Data; Longman: New York, NY; 2003.
Hoey, M.; Lexical Priming: A New Theory of Words and Language; Routledge: London, UK; 2005.
Ishizaki, Suguru; Toward a Unified Theory of Verbal-Visual Strategies in Communication Design; IEEE International Professional Communication Conference; Hawaii; Jul. 2009.
Kaufer, David; Genre Variation and Minority Ethnic Identity: Exploring the Personal Profile in Indian American Community Publications; Discourse & Society, 17(6); pp. 761-784; 2006.
Kaufer, David, Al-Malki, Amal Mohammed; A 'First' for Women in the Kingdom: Arab/West Representations of Female Trendsetters in Saudi Arabia; Journal of Arab and Muslim Media Research, 2(2); pp. 113-133; 2009.
Kaufer, David, Al-Malki, Amal Mohammed; The War on Terror Through Arab-American Eyes: The Arab-American Press as a Rhetorical Counterpublic; Rhetoric Review, 28(1); pp. 47-65; 2009.
Kaufer, David, Butler, Brian; Rhetoric and the Arts of Design; Lawrence Erlbaum Associates: Mahwah, NJ; 1996.
Kaufer, David, Butler, Brian; Designing Interactive Worlds with Words: Principles of Writing as Representational Composition; Lawrence Erlbaum Associates: Mahwah, NJ; 2000.
Kaufer, David, Geisler, Cheryl, Ishizaki, Suguru; Vlachos, Pantelis; Textual Genre Analysis and Identification; in Ambient Intelligence for Scientific Discovery, Y. Cai (Ed.); Springer: New York, NY; pp. 129-151; 2005.
Kaufer, David; Flaming: A White Paper; Carnegie Mellon University; Jun. 2000.

(56) References Cited

OTHER PUBLICATIONS

Klein, H.; Text Analysis Info, Category Systems; http://textanalysis.info; 2011.
McCarthy, Philip; Graesser, Arthur, McNamara, Danielle; Distinguishing Genre Using Coh-Metrix Indices of Cohesion; Society for Text and Discourse Conference; Minneapolis, MN; Jul. 2006.
Miller, George; WordNet: A Lexical Database for English; Communications of the ACM, 38(11); pp. 39-41; 1995.
Ong, Walter; Ramus Method, and the Decay of Dialogue: From the Art of Discourse to the Art of Reason; University of Chicago Press: Chicago, IL; 1958.
Perelman, Chaim, Olbrechts-Tyteca, Lucie; The New Rhetoric: A Treatise on Argumentation; University of Notre Dame Press: South Bend, IN; 1969.
Popping, Roel; Computer-Assisted Text Analysis; Sage Publishing: Thousand Oaks, CA; 2000.
Richards, Lyn; Using NVivo in Qualitative Research; Sage Publishing: London, UK; 1999.
Sekhon, Jasjeet; Bootstrap Kolmogorov-Smirnov; http://sekhon.berkley.edu/matching/ks.boot.html; 2015.
Stein, Benno, Meyer Zu Eissen, Sven; Retrieval Models for Genre Classification; Scandinavian Journal of Information Systems, 20(1); pp. 93-119; 2008.
Witmore, Michael, Hope, Jonathan; Shakespeare by the Numbers: on the Linguistic Texture of the Late Plays; in Early Modern Tragicomedy, S. Mukherji & R. Lynne (Eds.); D.S. Brewer Cambridge, UK; pp. 133-153; 2007.
Wray, Alison, Perkins, Michael; The Functions of Formulaic Language: an Integrated Model; Language and Communication, 20; pp. 1-28; 2000.

* cited by examiner

|  | AR | INF | INS | NA | OP | SC | SP | Prompt |
|---|---|---|---|---|---|---|---|---|
| Personal | 6.7 | 6.4 | 3.6 | 5.0 | 7.7 | 4.4 | 11 | 7.1 |
| Emotion | 4.1 | 3.5 | 2.4 | 3.8 | 4.7 | 3.4 | 5.4 | 4.0 |
| Assertive | 3.3 | 3.4 | 2.6 | 1.9 | 3.0 | 1.7 | 5.0 | 3.6 |
| Description | 10.0 | 14.0 | 29.4 | 20.8 | 18.7 | 35.6 | 15.1 | 5.0 |
| Public | 9.0 | 5.7 | 2.8 | 4.0 | 3.7 | 1.9 | 4.3 | 12.7 |
| Academic | 14.3 | 12.9 | 10.0 | 8.6 | 8.3 | 6.6 | 8.1 | 16.7 |
| Future | 1.7 | 1.7 | 1.7 | 1.3 | 1.4 | 1.2 | 1.8 | 2.1 |
| Past | 1.0 | 1.0 | 0.3 | 3.5 | 2.0 | 0.6 | 2.6 | 1.3 |
| Personal Rel. | 1.6 | 1.1 | 0.7 | 1.0 | 1.5 | 0.8 | 1.5 | 1.7 |
| Reasoning | 5.0 | 4.5 | 2.8 | 3.2 | 3.6 | 2.0 | 4.4 | 6.4 |
| Interactive | 2.3 | 3.5 | 5.4 | 1.0 | 1.7 | 1.1 | 2.0 | 1.7 |
| Elaboration | 10.7 | 11.2 | 10.9 | 10.4 | 9.6 | 10.6 | 9.3 | 12.2 |
| Reporting | 13.2 | 13.8 | 13.4 | 10.8 | 11.9 | 11.0 | 12.2 | 12.7 |
| Directives | 0.4 | 0.5 | 2.7 | 0.2 | 0.3 | 0.2 | 0.3 | 0.2 |
| Narrative | 3.2 | 3.2 | 2.1 | 6.0 | 5.0 | 3.1 | 4.5 | 2.2 |
| Character | 5.6 | 4.9 | 1.2 | 8.0 | 7.8 | 7.2 | 4.5 | 4.2 |
| NO MATCH | 7.9 | 8.5 | 8.2 | 10.4 | 9.1 | 8.5 | 7.8 | 6.3 |

FIG. 4

SYSTEMS AND METHODS FOR DETERMINING THE VALIDITY OF AN ESSAY EXAMINATION PROMPT

CROSS-REFERENCE TO RELATED APPLICATIONS

This application claims priority to U.S. Provisional Application No. 62/000,023, filed May 19, 2014, entitled "Method for Constructing an Empirical Argument for Ecological Validity of Assessment," the entirety of which is herein incorporated by reference.

TECHNICAL FIELD

The technology described herein relates automated assessment of examination prompts and more particularly supporting the validity of examination questions.

BACKGROUND

Questions (e.g., essay prompts) provided to examinees in an examination seek to measure the examinee's ability in a certain area of interest. For example, a question may seek to evaluate an examinee's knowledge level or may look to measure an examinee's ability to perform a certain skill, such as arguing persuasively. A score attributed to an examinee purports to give an indication of the examinee's ability level in the area of interest. But that score is only helpful if the question demanded use of that ability level in preparing a response.

Systems and methods as described herein automatically measure examination questions to see if they are actually testing the abilities that they were designed to test. These systems and methods evaluate millions of strings of English words (e.g. up to seven words) long across a number of initial responses to a number of candidate questions being evaluated. The sheer volume of comparisons and evaluations necessary to perform the described evaluations, make this process impossible for a human to effectively perform by hand.

SUMMARY

Systems and methods are provided for determining whether an examination prompt elicits responses of a type for which the examination prompt is designed. Word types for each of a plurality of words in a plurality of responses to the examination prompt are identified. An evaluation distribution of the identified word types is determined. Predetermined distributions stored on a computer-readable medium associated with a plurality of different response types are accessed, and the evaluation distribution is compared to each of the predetermined distributions to determine to which predetermined distribution the evaluation distribution is most similar. A determination is made as to whether the most similar distribution is associated with a same response type as the type for which the examination prompt is designed. An indication is made as to whether the examination prompt is deemed to elicit responses of the type for which the examination prompt is designed.

As another example, a system for determining whether an examination prompt elicits responses of a type for which the examination prompt is designed includes a processing system comprising one or more data processors and a computer-readable medium encoded with instructions for commanding the processing system. In the method, word types for each of a plurality of words in a plurality of responses to the examination prompt are identified. An evaluation distribution of the identified word types is determined. Predetermined distributions stored on a computer-readable medium associated with a plurality of different response types are accessed, and the evaluation distribution is compared to each of the predetermined distributions to determine to which predetermined distribution the evaluation distribution is most similar. A determination is made as to whether the most similar distribution is associated with a same response type as the type for which the examination prompt is designed. An indication is made as to whether the examination prompt is deemed to elicit responses of the type for which the examination prompt is designed.

As a further example, a computer-readable medium is encoded with instructions for commanding one or more data processors to execute a method for determining whether an examination prompt elicits responses of a type for which the examination prompt is designed. In the method, word types for each of a plurality of words in a plurality of responses to the examination prompt are identified. An evaluation distribution of the identified word types is determined. Predetermined distributions stored on a computer-readable medium associated with a plurality of different response types are accessed, and the evaluation distribution is compared to each of the predetermined distributions to determine to which predetermined distribution the evaluation distribution is most similar. A determination is made as to whether the most similar distribution is associated with a same response type as the type for which the examination prompt is designed. An indication is made as to whether the examination prompt is deemed to elicit responses of the type for which the examination prompt is designed.

BRIEF DESCRIPTION OF THE FIGURES

FIG. 4 is a diagram depicting example distributions of word types across multiple response types.

DETAILED DESCRIPTION

Figure 1:
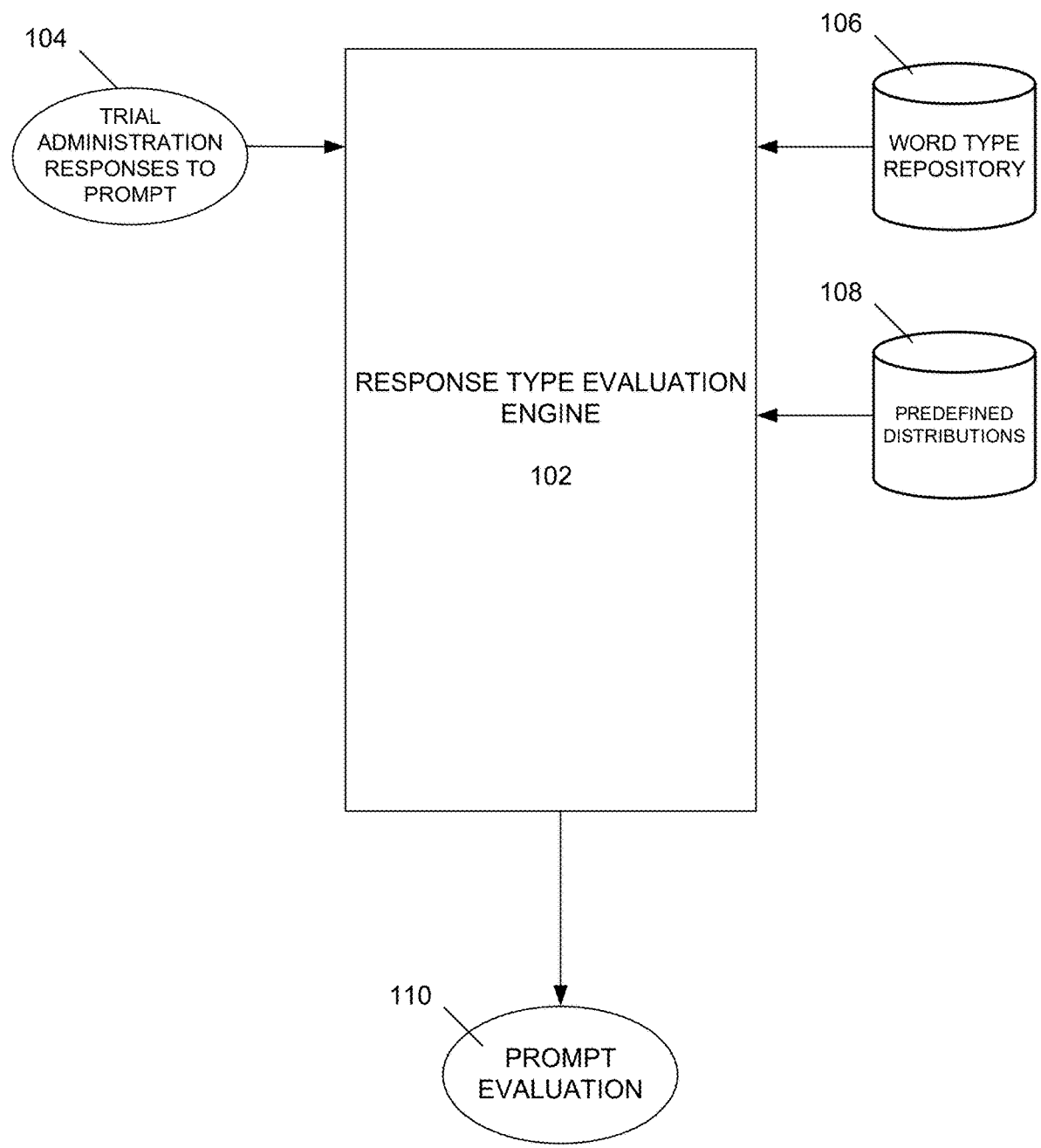
FIG. 1 is a block diagram depicting a computer-implemented response type evaluation engine.

FIG. 1 is a block diagram depicting a computer-implemented response type evaluation engine. The response type evaluation engine 102 determines whether an examination prompt elicits responses of a type for which the examination prompt is designed. For example, if the prompt is designed to test an ability of an examinee to present a written argument, the engine will determine how similar responses to that prompt are to "real-world" written arguments. Real-world arguments are those arguments presented outside of the test taking arena.

Examinations tend to be non-organic events, where examinees are asked to provide responses in a non-normal environment. For example, examinees may have limited time or limited source materials available compared to non-examination scenarios. Because of this artificiality, it may be desirable to show that the examination prompts are eliciting responses that are actually similar to the types of responses that are desired. Thus, in the example given above, the engine 102 determines whether the prompt is eliciting argument responses that are similar to written arguments prepared outside of an examination context.

A response type evaluation engine 102 evaluates trial responses 104 to one or more prompts (e.g., one or more questions) that are being considered for inclusion on an upcoming examination. Those trial responses 104 could be gathered from a mock test administration where trial-examinees (e.g., examinees of similar demographics to those who will be taking the live exam) provide responses to one or more candidate test prompts under test-like conditions. The response type evaluation engine 102 compares those trial responses 104 to texts prepared outside of the examination context to determine to what type of writing the trial responses are most similar. If the trial responses 104 are most similar to non-examination responses of the desired type, then confidence is increased that the prompts elicit responses of the desired type.

In the example of FIG. 1, the comparison of the trial responses 104 to the texts prepared outside of the examination context is performed based on word types used across the two categories. The response type evaluation engine 102 accesses a word type repository 106 that associates word types with a set of strings of words of one or more words in length. The engine 102 identifies word types for each of a plurality of words in the trial responses 104. The engine then determines a distribution of the words in the trial responses 104 across the plurality of word types. Predefined distributions 108 associated with different response types (e.g., texts of different types prepared outside of the examination context) are accessed from a computer-readable storage medium. The engine compares the distribution of words from the trial responses 104 to the predefined distributions 108. The engine 102 may determine one or more of a variety of metrics, including to which response type distribution 108 the distribution for the trial responses 104 is most similar and how similar the response type distribution 108 for the desired response type is to the distribution for the trial responses 104. Those metrics can be utilized by a computer-implemented scoring model to provide a prompt evaluation 110 that provides an indication as to how well the candidate prompt elicits responses of the desired type (e.g., narrative responses).

The word type repository can take a variety of forms, such as a dictionary containing parts of speech. In one embodiment, the word type repository is a rhetorical thesaurus that includes classification of strings (combinations of 1 of more words) according to the rhetorical category that those strings represent. In one embodiment, the word type repository contains classifications for millions of strings (e.g., 200,000 single words and over 40 million strings). The inclusion of classifications for strings of more than one word in length is beneficial because the proper classification of 1-grams can be ambiguous based on context (e.g., the word jump has different rhetorical effects in: "She jumped onto the wall;" versus "He'll get a jump on the problem."). In one example, the word type repository 106 is a Kaufer Rhetorical Thesaurus that categories words into 16 top level categories and into additional sub-categories. In one example, the top level categories (word types) are: Personal, Emotion, Description, Public, Academic, Past, Future, Personal Relations, Reasoning, Interactive, Elaborative, Reporting, Directing, Narrative, Character, and Assertive.

In one example, using a Kaufer Rhetorical Thesaurus, the engine 102 classifies strings of the following sentences that appear in one of the trial responses 104 being analyzed as follows. Example sentences: "The concept of individual responsibility is necessary in today's society. Where would our society and our people be without accountability for one's actions?" Example categorization:

| Rhetorical Category | # (proportion) of letters in matches | Matched strings |
| --- | --- | --- |
| Academic | 38 (.28) | concept, individual responsibility, society |
| Public | 23 (.17) | necessary, accountability |
| Personal | 16 (.12) | in today's society |
| Interactive | 12 (.09) | .Where would, ? |
| Personal relations | 12 (.09) | our, our people |
| Reporting | 11 (.08) | is, be, actions |
| Reasoning | 7 (.05) | Without |
| Elaboration | 5 (.04) | one's |
| UNMATCHED | 11 (.08) | The, of, and, for |
| TOTAL | 135 (1.0) | |

That categorization results in a distribution of strings of: Academic 28%, Public 17%; Personal 12%, Interactive 9%, Personal Relations 9%, Reporting 8%, Reasoning 5%, Elaboration 4%, Unmatched 8%. That distribution can then be compared to distributions for non-examination texts of different types to identify similarities and differences to such non-examination texts.

The predefined distributions 108 are associated with texts (e.g., text generated in non-examination contexts) of different types. The different types can take a variety of forms. In one example, the different types include different genres, such as: argumentative texts, informational texts, instructional texts, narrative texts, self-portrait texts, other-portrait texts, and scenic texts. The distribution computed by the engine 102 for the trial responses 104 is compared to the predefined distributions 108 for those types, such as to see to which of those types the trial responses 104 are most similar.

Figure 2:
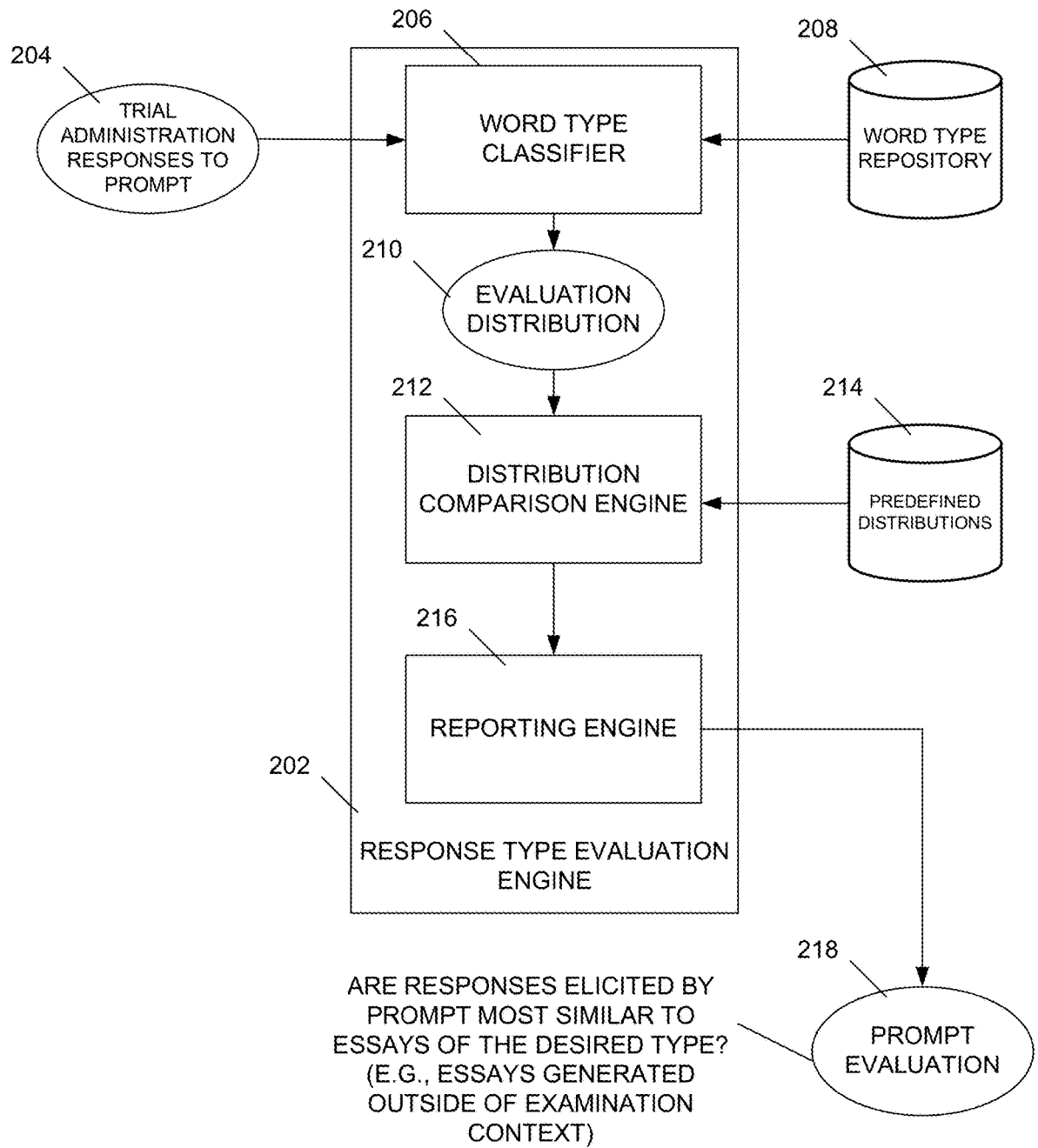
FIG. 2 is a diagram depicting example details of a response type evaluation engine.

FIG. 2 is a diagram depicting example details of a response type evaluation engine. A response type evaluation engine 202 identifies word types for each of a plurality of words in a plurality of responses 204 to an examination prompt using a word type classifier 206 that has access to a word type repository 208. For example, a trial administration of an exam may provide a set of 5 prompts that are designed to elicit narrative response from examinees. The trial administration is provided to 50 trial examinees. This results in 250 essay responses. The word type classifier 206 classifies the words of those 250 essay responses to generate an evaluation distribution 210 across those 250 essay responses. A distribution comparison engine 212 accesses predetermined distributions 214 stored on a computer-readable medium. Those predetermined distributions 214 are associated with different response types, such as different response types produced outside of an examination context (e.g., essays of different types produced in a long-term classroom or research writing environment). The distribution comparison engine compares the evaluation distribution 210 to the predefined distributions 214 to generate one or more metrics that are provided to a reporting engine 216. The reporting engine 216 outputs an evaluation 218 for the prompt. That evaluation 218 can be output to a graphical user interface for display or stored in a computer-readable medium for use in downstream processing. The prompt evaluation 218 provides an indication of an effectiveness of the prompt at eliciting responses of the type desired. For example, the prompt evaluation 218 may indicate whether the trial responses 204 are most similar to non-examination texts of the desired type.

If the engine 202 determines that the trial responses 204 are significantly similar to the non-examination texts of the desired type, then the prompts that elicited those responses 204 may be utilized for a live examination, such as a high-stakes examination. If the engine 202 determines that the trial responses 204 are dissimilar to non-examination texts of the desired type or that the trial responses 204 are more similar to a different type of non-examination text, then the prompt(s) may be adjusted prior to being included on a live examination or may be discarded based on an inability to elicit the desired type of writing.

Figure 3:
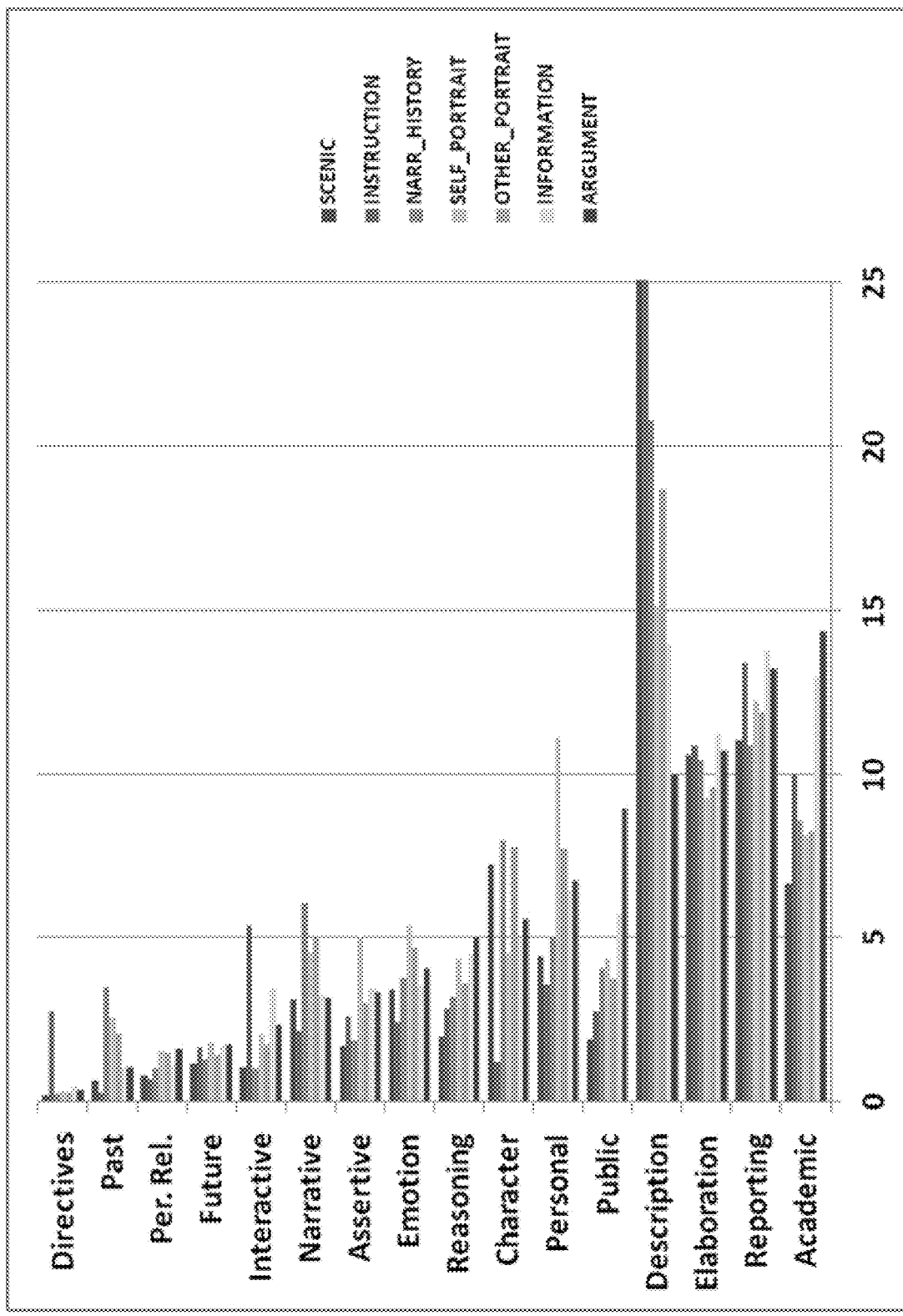
FIG. 3 is a diagram depicting differing distributions of word types for different response types.

FIG. 3 is a diagram depicting differing distributions of word types for different response types. Different word types are identified along the left side of the diagram, with one bar being present for each word type for each response type. Thus, the top bar for each word type indicates a typical proportion of words of that type in a Scenic response type. The second bar for each word type is for Instructional response types, with following bars being for Narrative, Self-Portrait, Other-Portrait, Informational, and Argument response types, respectively. The collection of word type bars for a given response type indicates the typical distribution of word types for that response type. Those distributions differ across response types. For example, the Argument response type typically includes more words of the Academic word type, as indicated in the bottom bar of FIG. 3, than other response types do.

Predefined distributions, such as the ones indicated in FIG. 3 can be generated in a variety of ways. In one example, a corpus of texts of a response type is analyzed to generate a distribution. For example, a corpus of argumentative texts (essays) generated as part of a college writing class may be compiled, where such essays are generated over a number of weeks as part of a semester-long project. Such essays differ from argument essays written in an examination in one or more ways, such as the amount of time a writer has to prepare and a number of sources that the writer can utilize. In one example, an argument response type distribution is made using more than 100 argumentative essays generated for a semester-long writing class. Word types for words in those essays are assigned, such as using a word type repository as described herein, and totals for those word types are compiled. Distributions can then be determined, such as by calculating percentages of each word type of all words (or strings) in the essays being analyzed.

FIG. 4 is a diagram depicting example distributions of word types across multiple response types (e.g., genres). Each column indicates a percentage of words in the comparison text set (e.g., the non-examination prepared essays) that are of a given word type for each of several different response types. Each row corresponds to a response type: Argument, Informational, Instructional, Narrative, Other-Portrait, Scenic, Self-Portrait. For example, for the Self-Portrait response type, non-examination essays typically use: 11% Personal, 5.4% Emotion, 5.0% Assertive, 15.1% Description, 4.3% Public, 8.1% Academic, 1.8% Future, 2.6% Past, 1.5% Personal Relationship, 4.4% Reasoning, 2.0% Interactive, 9.3% Elaboration, 12.2% Reporting, 0.3% Directive, 4.5% Narrative, and 4.5% Character word types. Other response types have differing distributions. For example, Instructional texts utilize 2.7% directive word types in comparison to the 0.3% utilized in Self-Portrait response types. A final row of FIG. 4 indicates word types for trial responses to one or more prompts of a trial examination (e.g., for one or more trial exam takers).

Having determined the distribution for the trial exam administration and having the distributions for the typical response types (e.g., as depicted in FIG. 4), the distributions can be compared to generate certain metrics. Differences between distributions can be calculated in a variety of ways. In one example, a distance between distributions method is utilized. In the example of FIG. 4, the 16 rhetorical categories and the Unmatched category cover 100% of an essay, where every character in every string is assigned to a single category. Therefore, it is possible to conceptualize this setting as a distribution of categories in a text, where the average proportion is an estmate of the probability of occurrence of the given category in a text of the given response type (genre). Thus, the probabiliy of a character in a Scenic text to be part of a reasoning string is estimated as p=0.02; this probability is about p=0.05 for an Argument text.

To compare two distributions, this method can use the information-theoretic notion of Kullback-Leibler divergence. The Kullback-Leibler divergence between probability distributions P and Q, denoted $D_{kl}(P\|Q)$, is as measure of the information lost when Q is used to approximate the true distribution P. Information is measured in bits.

To exemplify the measurement, consider a situation when a system seeks to identify the distribution P (say, the distribution of the rhetorical categories in Argument essays) with no prior information whatsoever, apart from the knowledge that a random variable distributed according to P has 17 possible values. One would guess a distribution Q that assigns the same probability to all categories, that is, Q is a uniform distribution, assigning the probability of 1/17=0.059 to each of the categories. $D_{kl}(P\|Q)$ would quantify the information inefficiency that is sustained by using Q instead of P: The larger $D_{KL}$, the more wasteful it is to approximate P using Q. It is in this sense that it measures distance from P to Q. Note that $D_{KL}$ is non-symmetric, that is, P could be a better approximation of Q than vice versa. $D_{kl}(P\|Q)$ is defined as follows:

$$D_{kl}(P\|Q) = \sum_i P(i) \times \log_2 \frac{P(i)}{Q(i)}$$

where the index i ranges over all possible values of the random variable. In this case, i ranges over the 16 rhetorical categories plus "unmatched;" the values of P(i) for various categories according to distributions corresponding to various genres are taken from FIG. 4, and P(i)=0.059 for all i for the uniform distribution. Thus, assuming the true distribution is that of Arg, and the system approximates that distribution with the uniform distribution, the system determines that $D_{KL}(Arg\|Uniform)=0.38$ bits. A distribution that would be farther than that from Arg would be worse than a random guess, i.e. would be misleading when trying to approximate Arg. Thus, where the difference between the distribution of the trial responses to the desired response type is less than 0.38 bits, then the prompt could be deemed to sufficiently elicit responses of the desired type. In another example, a lower threshold could be set (e.g., 0.25, 0.20, 0.15).

A second example uses a vector-space comparison. In that example, a response type (genre) is conceptualized as the process of selecting vocabulary from various rhetorical categories in certain proportions. Therefore, every piece of writing can be represented as a point in a 16-dimensional space, where the coordinate on the given axis is the proportion of the text that is selected from the relevant category. Two texts that are close in this space make similar word type selections; these texts would belong to similar response types.

An example system represents each set of essays as a point in the 16-dimensional rhetorical space. The coordinate on a given dimension (say, reasoning) is the average proportion of textual material that is selected from that category across all essays in the group (taken from FIG. 4). The system therefore has 8 points in the space, corresponding to the 8 sets of essays used in this study. Each point can be thought of as a vector connecting the origin (0 on all dimensions) to the relevant point in the space.

A common way of quantifying distance between any two vectors A and B is by measuring the angle α between the vectors. An example system measures angles in degrees (°). The angle α=0° represents maximal similarity (same vectors) and α=90° represents orthogonal vectors. The angle α between two vectors is calculated as follows:

$$\alpha = \frac{180}{\pi} \times \arccos \frac{\sum_i A_i \times B_i}{\sqrt{\sum_i (A_i)^2} \times \sqrt{\sum_i (B_i)^2}}$$

where the index i ranges over the 16 dimenstions, in our case. This is a measure of distance, that is, the larger the angle, the farther the vectors are in the space.

Figure 5:
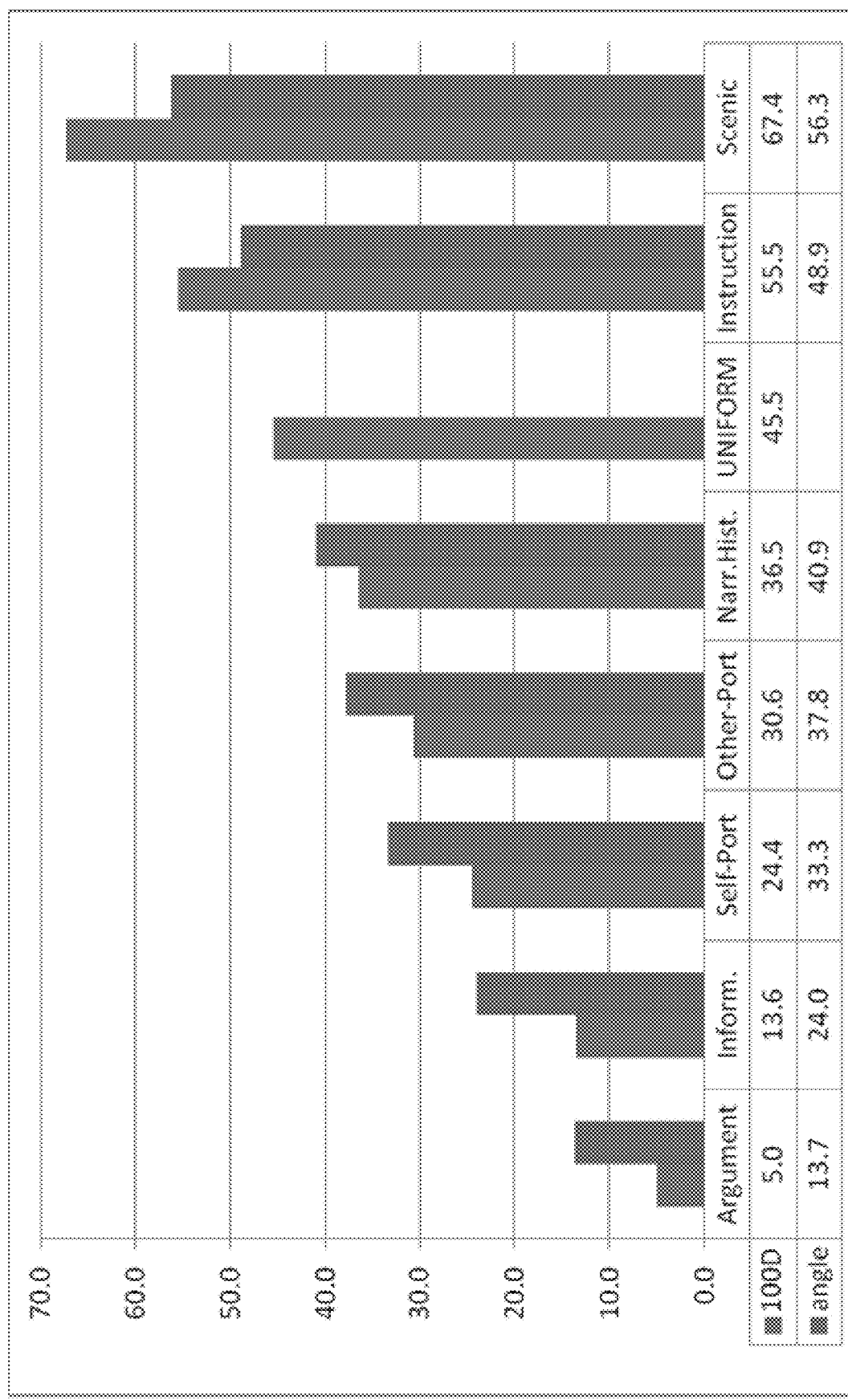
FIG. 5 is a diagram depicting two distribution difference metrics calculated based on the distributions of FIG. 4.

FIG. 5 is a diagram depicting the two above described metrics calculated based on the distributions of FIG. 4. Using the distance between distribution algorithm (times 100), the trial responses to the prompt scored a distance of 5.0 from typical non-examination prepared Argument texts, 13.6 from Informational texts, and larger distances from other response types. The trial responses had an angular difference using the vector-space comparison algorithm of 13.7 degrees from the Argument non-examination texts, 24.0 degrees from the Informational texts, with larger angles for other response types. Thus, the trial responses to the prompt(s) are most similar to Argument response types prepared outside of the examination context. If the prompts were designed to elicit argumentative responses, then these metrics may indicate that the prompts are eliciting the desired argumentative responses.

Figure 6:
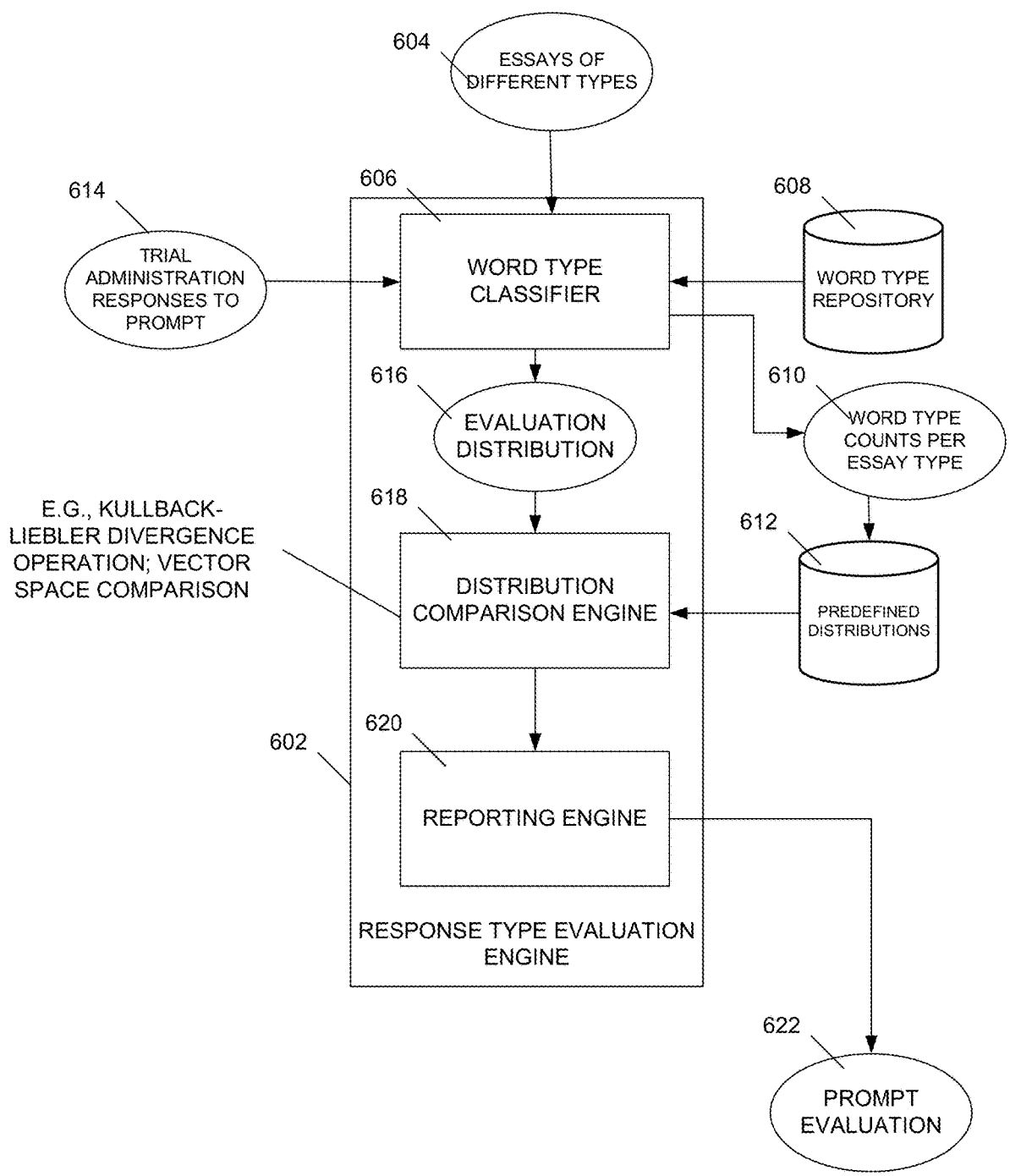
FIG. 6 is a block diagram depicting the determination of pre-defined distributions for different response types using a response type evaluation engine.

In addition to use in evaluating trial administration responses, certain of the components of a response type evaluation engine can be utilized in generating the predetermined distributions utilized by the engine in evaluating trial administration responses. FIG. 6 is a block diagram depicting the determination of pre-defined distributions for different response types using a response type evaluation engine. In a training mode, the engine 602 receives essays 604 of different types, where each essay includes a response-type indicator. Such essays 604 may be essays prepared as part of a semester-long writing project for a college class. A word type classifier 606 utilizes a word type repository 608 to identify word types for each string in the training essays 604. Those determined word types are compiled on a per-response-type basis at 610 and may be normalized (e.g., based on numbers of characters, numbers of strings evaluated in the training essays 604). The word counts 610 are used to generate the predefined distributions 612 for each response type that is stored in a computer-readable medium (e.g., as depicted in FIG. 4).

In operational mode, trial examination administration responses to a prompt 614 are received. The word type classifier 606 again uses the word type classifier 606 and the word type repository 608 to identify word types for strings in the trial essays 614 to generate an evaluation distribution 616 of the words in the trial essays 614. A distribution comparison engine 618 compares the distribution 616 for the trial essays 614 with the predefined distributions 612 previously determined for the different response types using the training essays 604 to determine one or more similarity metrics. Those similarity metrics are provided to a reporting engine 620 that outputs an evaluation 622 of the prompt's effectiveness. Should the prompt be deemed effective at eliciting the desired response type, then the prompt could be utilized in high stakes examination without further adjustment.

Figure 7:
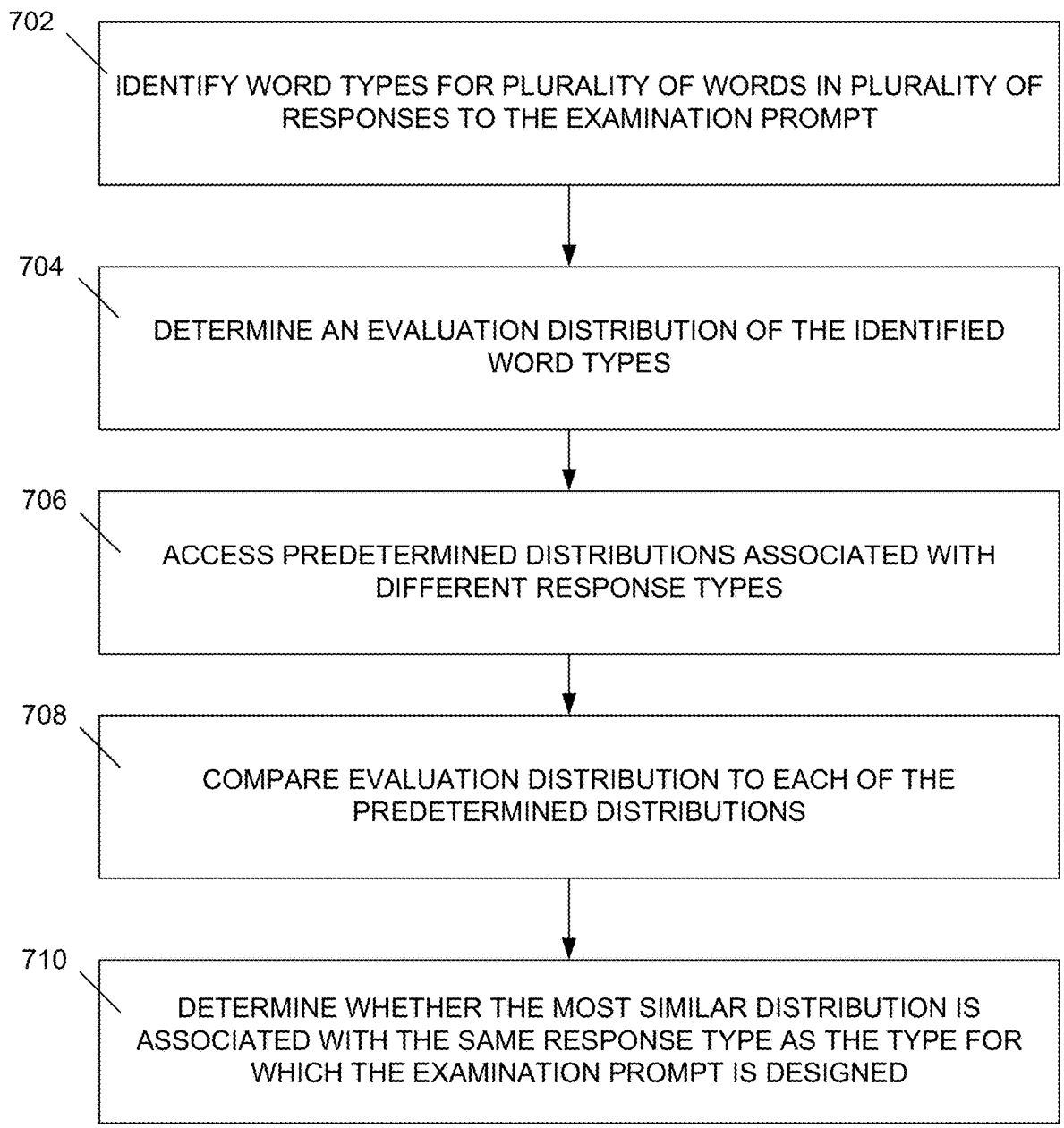
FIG. 7 is a flow diagram depicting steps of a processor-implemented method for determining whether an examination prompt elicits responses of a type for which the examination prompt is designed.

FIG. 7 is a flow diagram depicting steps of a processor-implemented method for determining whether an examination prompt elicits responses of a type for which the examination prompt is designed. At 702, word types for each of a plurality of words in a plurality of responses to the examination prompt are identified. An evaluation distribution of the identified word types is determined at 704. At 706, predetermined distributions stored on a computer-readable medium associated with a plurality of different response types are accessed, and the evaluation distribution is compared to each of the predetermined distributions at 708 to determine which predetermined distribution the evaluation distribution is most similar. A determination is made as at 710 to whether the most similar distribution is associated with a same response type as the type for which the examination prompt is designed. An indication is made as to whether the examination prompt is deemed to elicit responses of the type for which the examination prompt is designed.

Figure 8A:
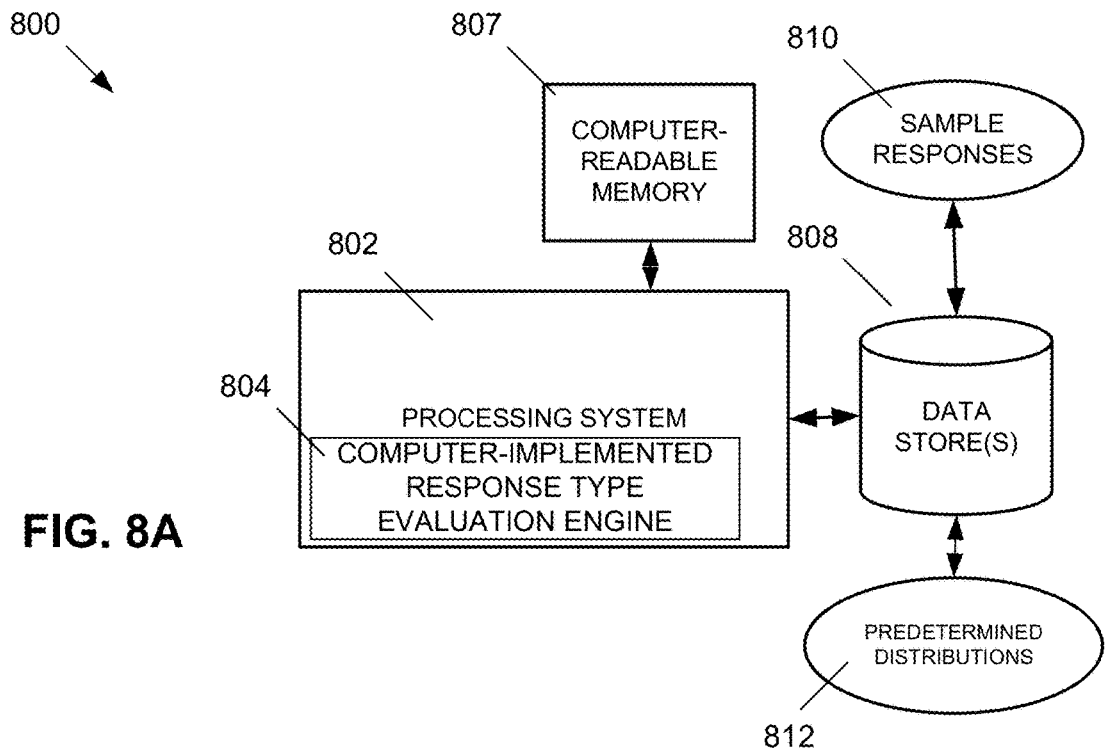
FIGS. 8A, 8B, and 8C depict example systems for implementing the approaches described herein for determining whether an examination prompt elicits responses of a type for which the examination prompt is designed.
Figure 8B:
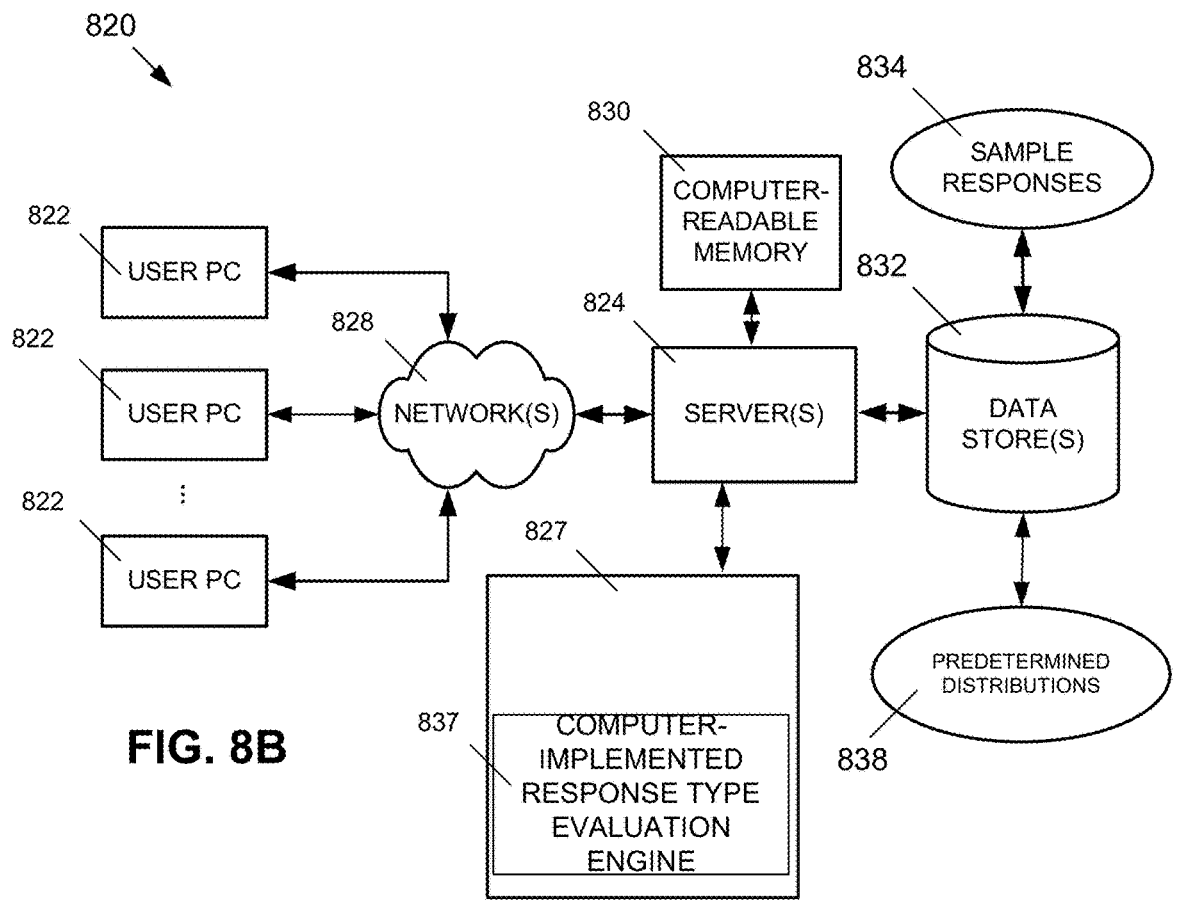
Figure 8C:
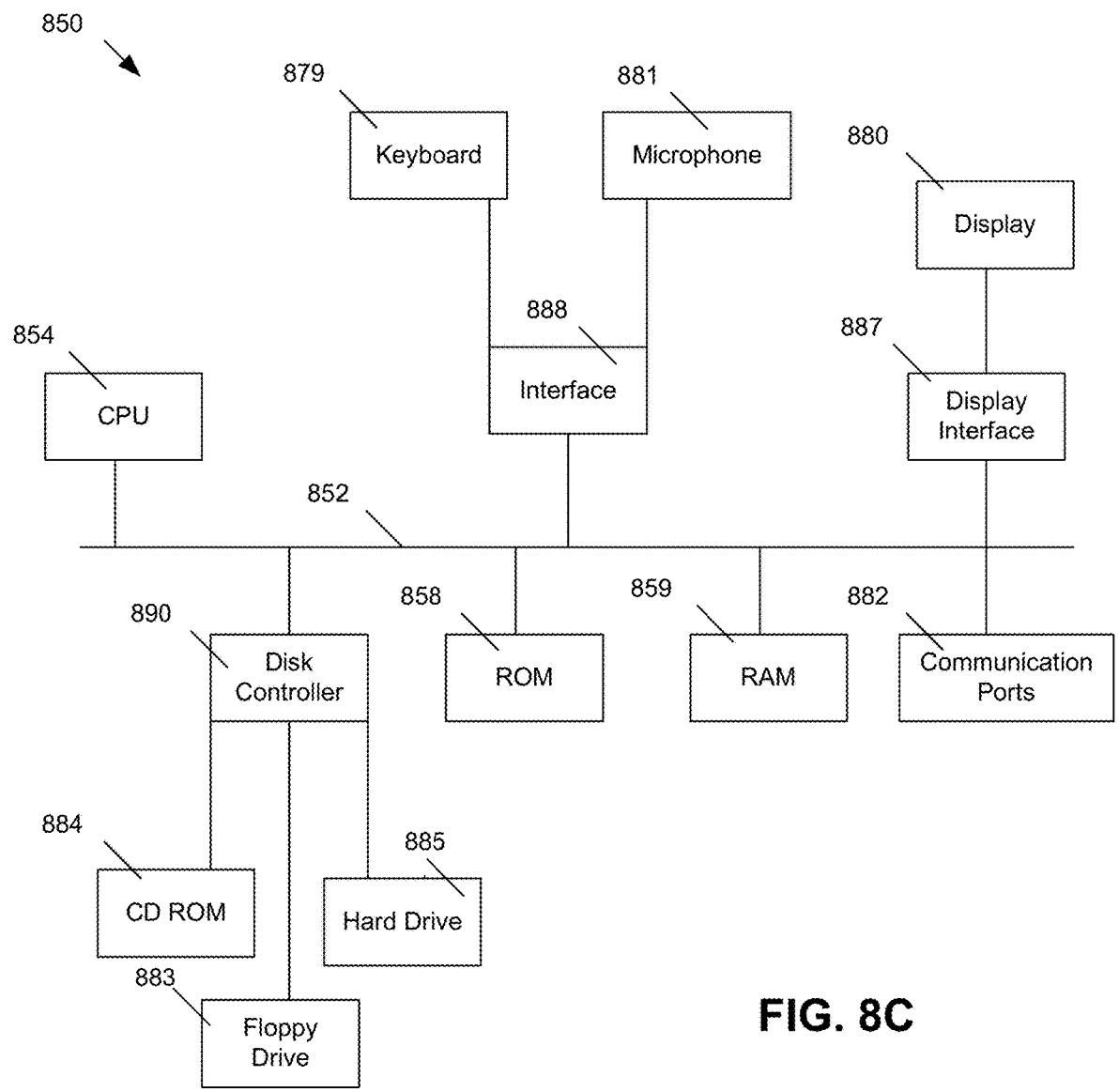

FIGS. 8A, 8B, and 8C depict example systems for implementing the approaches described herein for determining whether an examination prompt elicits responses of a type for which the examination prompt is designed. For example, FIG. 8A depicts an exemplary system 800 that includes a standalone computer architecture where a processing system 802 (e.g., one or more computer processors located in a given computer or in multiple computers that may be separate and distinct from one another) includes a computer-implemented response type evaluation engine 804 being executed on the processing system 802. The processing system 802 has access to a computer-readable memory 807 in addition to one or more data stores 808. The one or more data stores 808 may include sample responses 810 as well as predetermined distributions 812. The processing system 802 may be a distributed parallel computing environment, which may be used to handle very large-scale data sets.

FIG. 8B depicts a system 820 that includes a client-server architecture. One or more user PCs 822 access one or more servers 824 running a response type evaluation engine 837 on a processing system 827 via one or more networks 828. The one or more servers 824 may access a computer-readable memory 830 as well as one or more data stores 832.

The one or more data stores 832 may include sample responses 834 as well as predetermined distributions 838.

FIG. 8C shows a block diagram of exemplary hardware for a standalone computer architecture 850, such as the architecture depicted in FIG. 8A that may be used to include and/or implement the program instructions of system embodiments of the present disclosure. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 858 and random access memory (RAM) 859, may be in communication with the processing system 854 and may include one or more programming instructions for performing the method of generating a response type evaluation for trial responses to a prompt. Optionally, program instructions may be stored on a non-transitory computer-readable storage medium such as a magnetic disk, optical disk, recordable memory device, flash memory, or other physical storage medium.

In FIGS. 8A, 8B, and 8C, computer readable memories 807, 830, 858, 859 or data stores 808, 832, 883, 884 may include one or more data structures for storing and associating various data used in the example systems for generating a response type evaluation for trial responses to a prompt. For example, a data structure stored in any of the aforementioned locations may be used to store data from XML files, initial parameters, and/or data for other variables described herein. A disk controller 890 interfaces one or more optional disk drives to the system bus 852. These disk drives may be external or internal floppy disk drives such as 883, external or internal CD-ROM, CD-R, CD-RW or DVD drives such as 884, or external or internal hard drives 885. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 890, the ROM 858 and/or the RAM 859. The processor 854 may access one or more components as required.

A display interface 887 may permit information from the bus 852 to be displayed on a display 880 in audio, graphic, or alphanumeric format. Communication with external devices may optionally occur using various communication ports 882.

In addition to these computer-type components, the hardware may also include data input devices, such as a keyboard 879, or other input device 881, such as a microphone, remote control, pointer, mouse and/or joystick. These data input devices may connect to an interface 888 that allows them to communicate with the processing system 854.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

For example, while the above described examples utilize word types to compare responses to examination prompts with non-examination texts, other comparisons can also be made. For example, a comparison could be made between a proportion of words in the trial responses that use metaphors with metaphor usage proportions for non-examination texts. If it is determined that the trial responses contain significantly fewer metaphors than the comparable non-examination responses, that could suggest that the examination prompts and possibly other aspects of the testing situation tend to elicit less creative writing. If evaluation of creative writing was one of the goals of the assessment, such a finding could be problematic and lead to re-drafting of the task overall or the specific prompts.

It is claimed:

1. A computer-implemented method of determining a validity of an essay examination prompt based on whether a plurality of responses to the essay examination prompt are of a response type for which the essay examination prompt is designed, comprising: receiving data comprising the plurality of responses; for each response in the plurality of responses: identifying, using a processing system accessing a word-type repository stored on a computer-readable medium including classifications of strings according to a rhetorical category to which the strings represent, rhetorical categories for each of a plurality of strings in the response, each string being a member of one of a plurality of predefined rhetorical categories, wherein a string comprises at least one word and the plurality of strings comprises the response; and generating, using the processing system, an evaluation distribution of the identified rhetorical categories; generating, using the processing system, a total distribution based on each evaluation distribution; accessing, using the processing system, predetermined distributions stored on a computer-readable medium associated with a plurality of different response types, wherein the predetermined distributions are determined based at least in part on essays of the different response types generated in a non-examination context; comparing, using the processing system, the total distribution to each of the predetermined distributions, the comparing being performed using a Kullback-Leibler divergence operation; determining a predetermined distribution that is most similar to the total distribution; determining, using the processing system, whether the predetermined distribution is associated with the response type for which the essay examination prompt is designed; providing, using the processing system, an indication that the essay examination prompt is not deemed to elicit responses of the response type for which the essay examination prompt is designed; and transmitting the essay examination prompt over a computer network for display on a graphical user interface when the essay examination prompt is deemed to elicit responses of the response type for which the essay examination prompt is designed, wherein the essay examination prompt is adjusted based on the indication,
   wherein the word-type repository is a repository containing more than 1 million words and phrases categorized according to rhetorical category.

2. The method of claim 1, wherein the essay examination prompt is included in a live examination.

3. The method of claim 1, wherein the evaluation distribution is determined using identified rhetorical categories from responses to a plurality of examination prompts of a trial examination, wherein the method determines whether the plurality of examination prompts elicit responses of the response type for which they are designed.

4. The method of claim 1, wherein the essay examination prompt is designed to elicit an argumentative response type.

5. The method of claim 1, wherein the essay examination prompt is designed to elicit a response of a response type selected from the group comprising: informational, instructional, narrative, scenic, other-portrait, or self-portrait.

6. The method of claim 1, wherein the predefined rhetorical categories include two or more of: personal, emotion, assertive, description, public, academic, future, past, personal relations, reasoning, interactive, elaborative, reporting, directing, narrative, character, no match.

7. The method of claim 1, wherein the essays are generated over a multi-week period of time.

8. A computer-implemented system for determining a validity of an essay examination prompt based on whether a plurality of responses to the essay examination prompt are of a response type for which the essay examination prompt is designed, comprising: a processing system; one or more non-transitory computer-readable mediums encoded with: a repository identifying one of a plurality of predefined rhetorical categories for each of a plurality of words; and a predetermined rhetorical category distribution associated with each of a plurality of different response types; instructions for commanding the processing system to: receive data comprising the plurality of responses; for each response in the plurality of responses: identify, by accessing a word-type repository stored on a computer-readable medium including classifications of strings according to a rhetorical category to which the strings represent, rhetorical categories for each of a plurality of strings in the response, each string being a member of one of the plurality of predefined rhetorical categories, wherein a string comprises at least one word and the plurality of strings comprises the response; and generate an evaluation distribution of the identified rhetorical categories; generate a total distribution based on each evaluation distribution; access the predetermined distributions associated with the plurality of different response types, wherein the predetermined distributions are determined based at least in part on essays of the different response types generated in a non-examination context; compare the total distribution to each of the predetermined distributions to determine which predetermined distribution the evaluation distribution is most similar, the comparison being performed using a Kullback-Leibler divergence operation; to determine a predetermined distribution that is most similar to the total distribution; determine whether the predetermined distribution is associated with the response type for which the essay examination prompt is designed; provide, using the processing system, an indication that the essay examination prompt is not deemed to elicit responses of the response type for which the essay examination prompt is designed; and transmit the essay examination prompt over a computer network for display on a graphical user interface when the essay examination prompt is deemed to elicit responses of the response type for which the essay examination prompt is designed, wherein the essay examination prompt is adjusted based on the indication,
   wherein the word-type repository is a repository containing more than 1 million words and phrases categorized according to rhetorical category.

9. The system of claim 8, the essay examination prompt is included in a live examination.

10. The system of claim 8, wherein the evaluation distribution is determined using identified rhetorical categories from responses to a plurality of examination prompts of a trial examination, wherein the method determines whether the plurality of examination prompts elicit responses of the response type for which they are designed.

11. The system of claim 8, wherein the essay examination prompt is designed to elicit an argumentative response type.

12. The system of claim 8, wherein the essay examination prompt is designed to elicit a response of a response type selected from the group comprising: informational, instructional, narrative, scenic, or self-portrait.

13. A non-transitory computer-readable medium encoded with instructions for commanding a processing system to execute steps of a method for determining a validity of an essay examination prompt based on whether a plurality of responses to the essay examination prompt are of a response type for which the essay examination prompt is designed, comprising: receiving data comprising the plurality of responses; for each response in the plurality of responses: identifying, using a processing system accessing a word-type repository stored on a computer-readable medium including classifications of strings according to a rhetorical category to which the strings represent, rhetorical categories for each of a plurality of strings in the response, each string being a member of one of a plurality of predefined rhetorical categories, wherein a string comprises at least one word and the plurality of strings comprises the response; and generating, using the processing system, an evaluation distribution of the identified rhetorical categories; generating a total distribution based on each evaluation distribution; accessing, using the processing system, predetermined distributions stored on a computer-readable medium associated with a plurality of different response types, wherein the predetermined distributions are determined based at least in part on essays of the different response types generated in a non-examination context; comparing, using the processing system, the total distribution to each of the predetermined distributions, the comparing being performed using a Kullback-Leibler divergence operation; determining a predetermined distribution that is most similar to the total distribution; determining, using the processing system, whether the predetermined distribution is associated with the response type for which the essay examination prompt is designed; providing, using the processing system, an indication that the essay examination prompt is not deemed to elicit responses of the response type for which the essay examination prompt is designed; and transmitting the essay examination prompt over a computer network for display on a graphical user interface when the essay examination prompt is deemed to elicit responses of the response type for which the essay examination prompt is designed, wherein the essay examination prompt is adjusted based on the indication, wherein the word-type repository is a repository containing more than 1 million words and phrases categorized according to rhetorical category.

14. The non-transitory computer-readable medium of claim 13, wherein the evaluation distribution is determined using identified rhetorical categories from responses to a plurality of examination prompts of a trial examination, wherein the method determines whether the plurality of examination prompts elicit responses of the response type for which they are designed.

* * * * *